March 1, 1938.　　　　O. SANDBERG　　　　2,110,113
WRAPPING MACHINERY
Filed April 19, 1935　　　　14 Sheets-Sheet 6
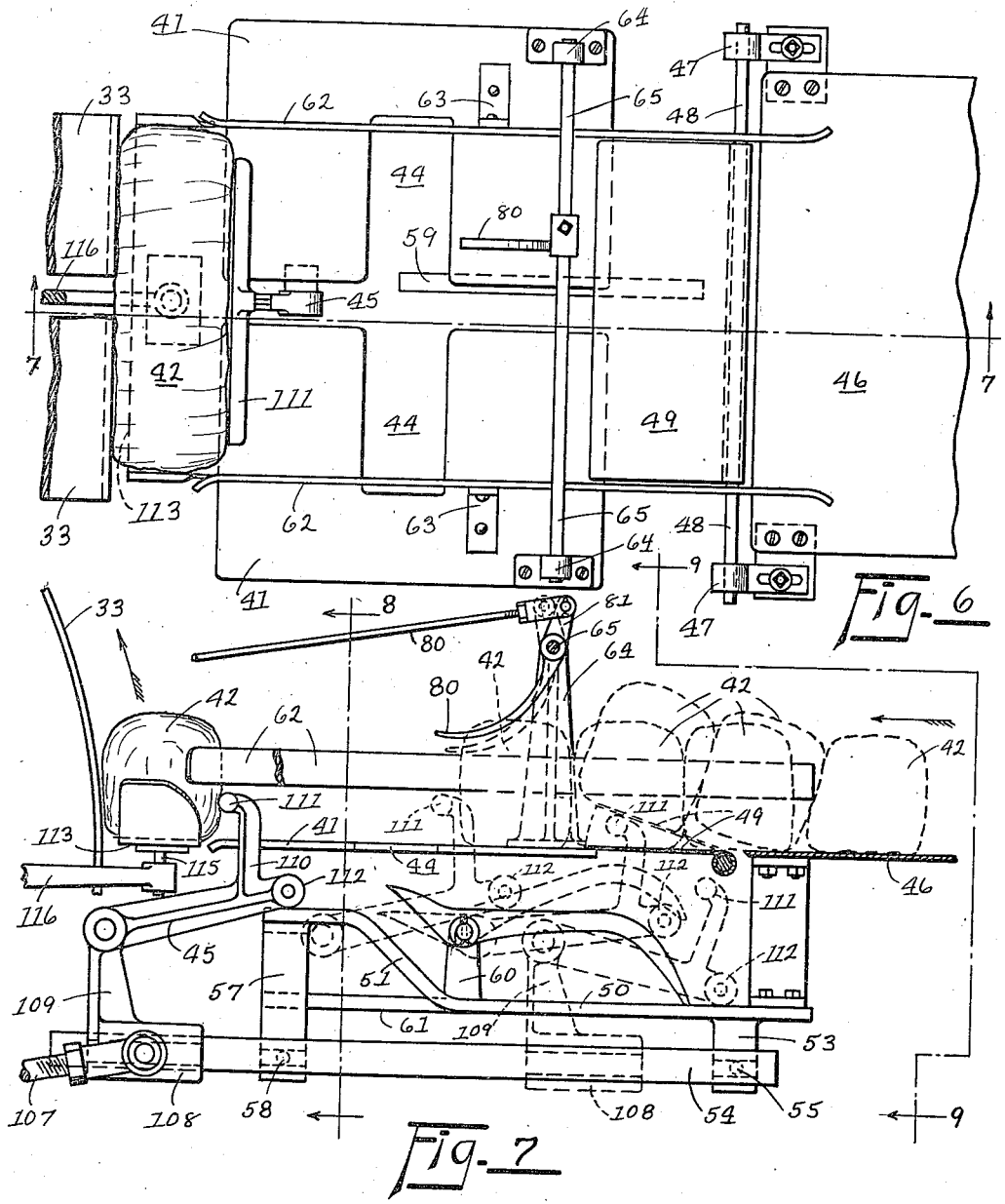
Inventor
Oscar Sandberg

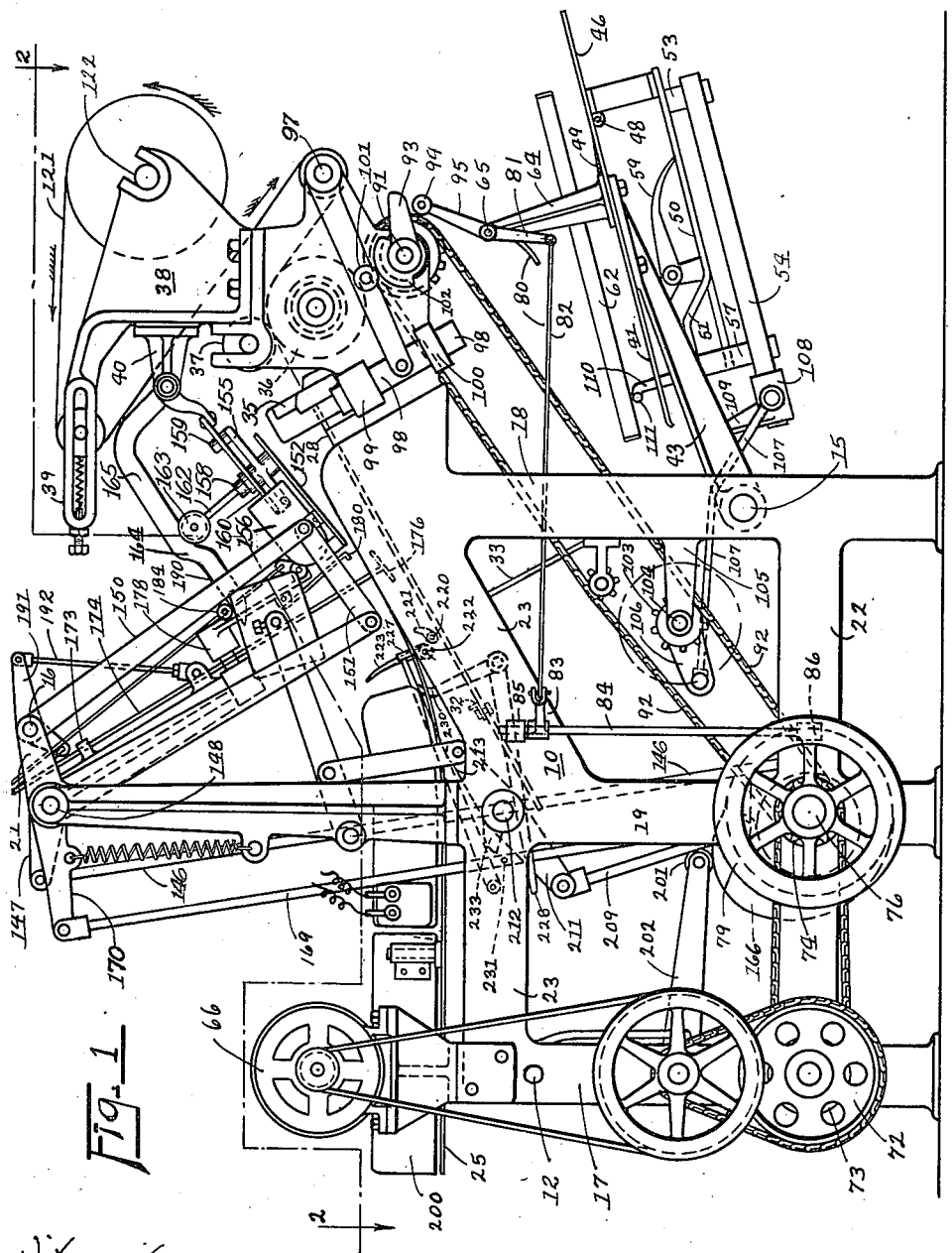

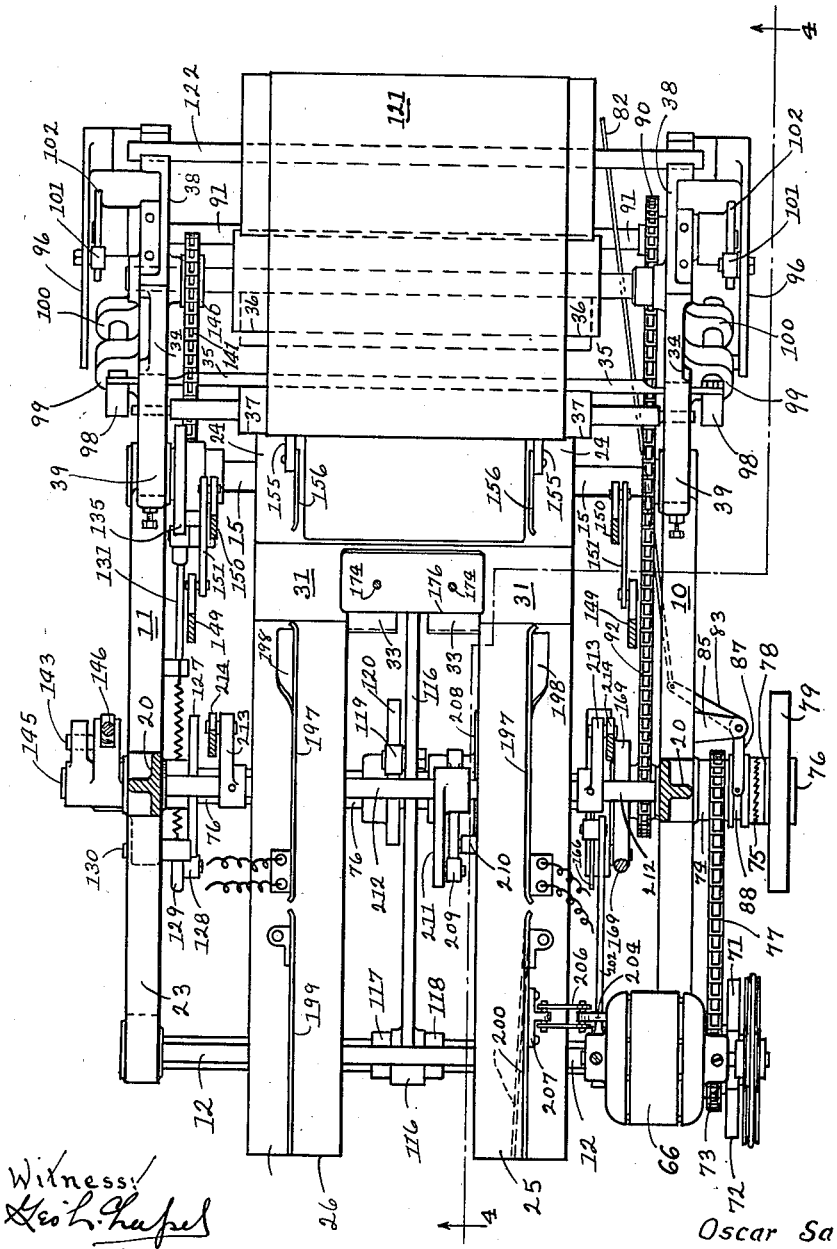

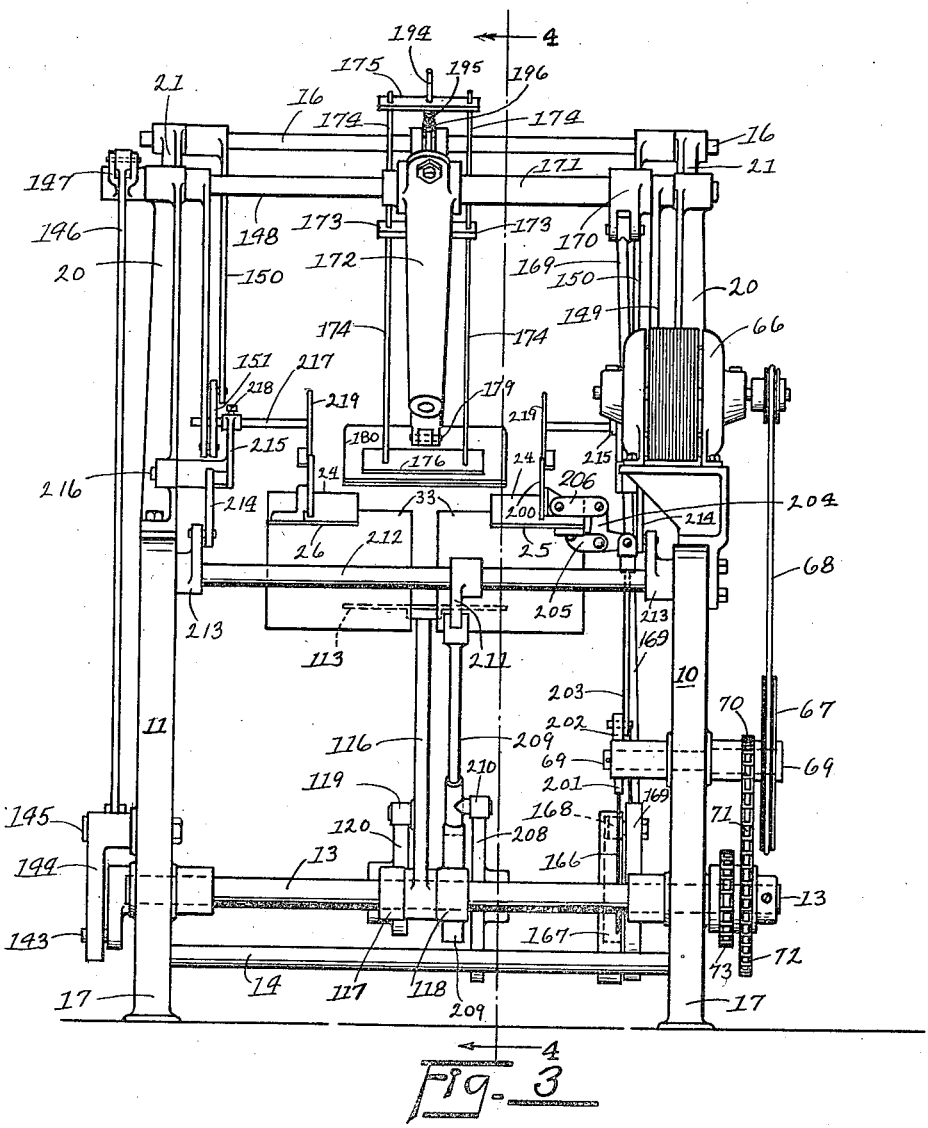

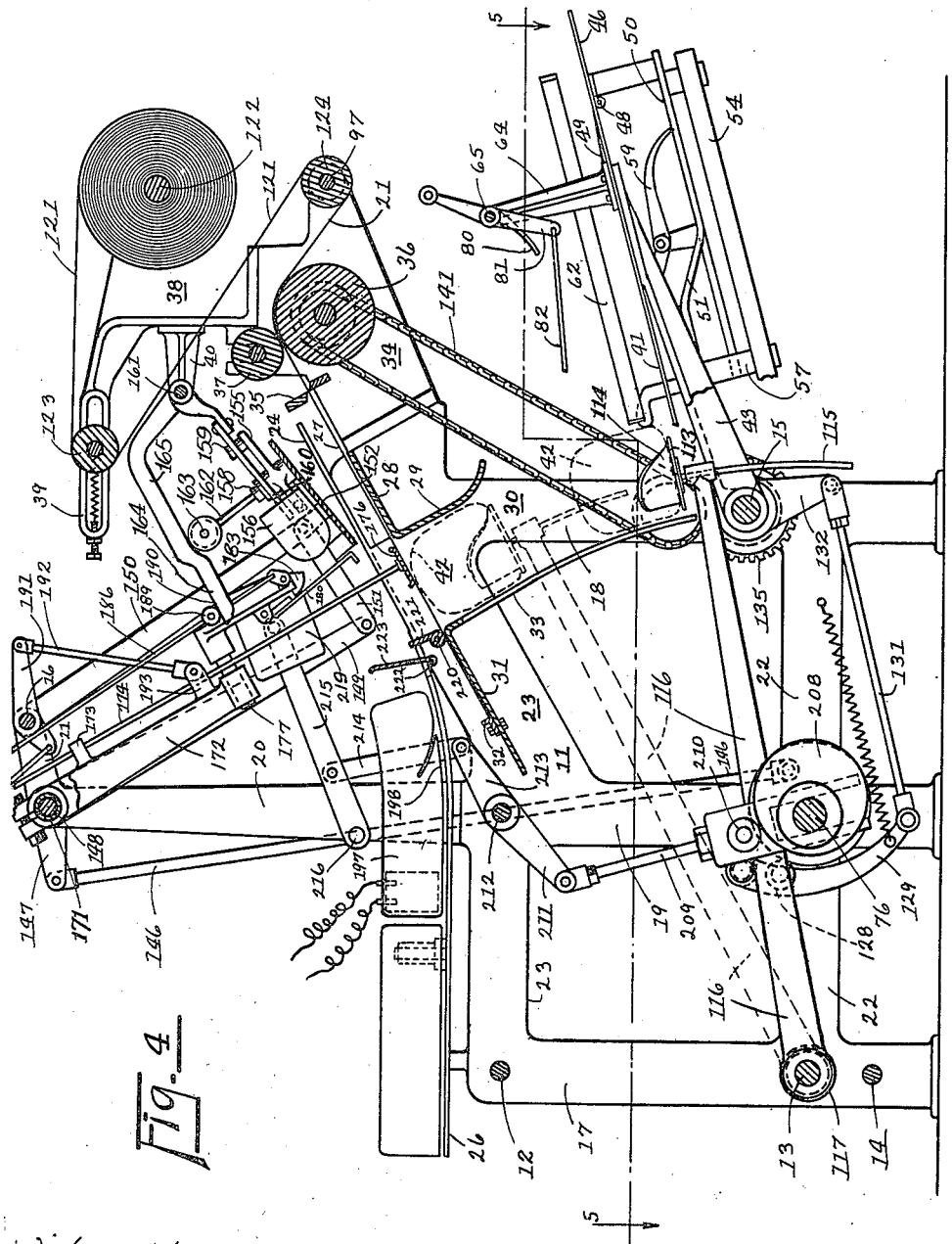

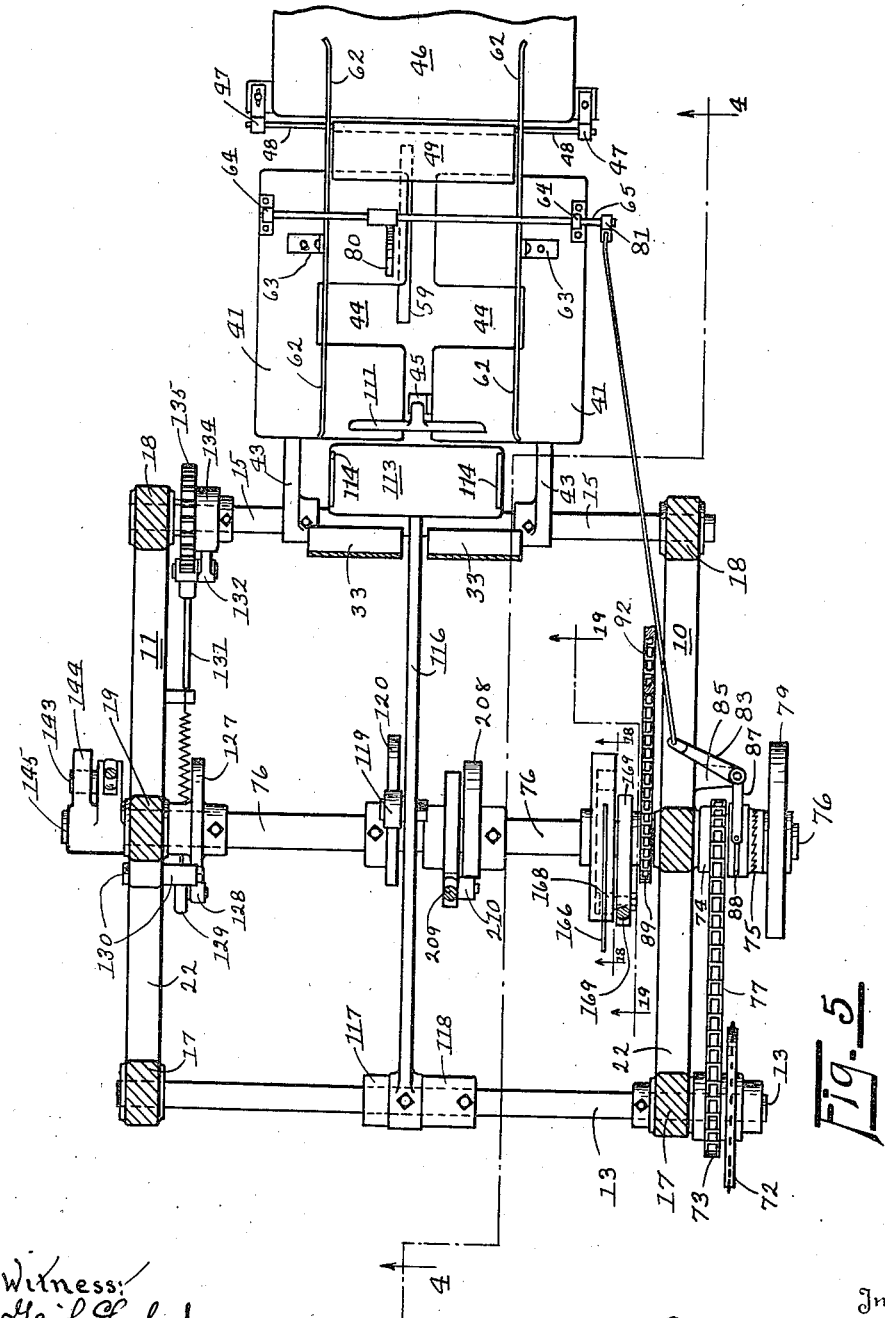

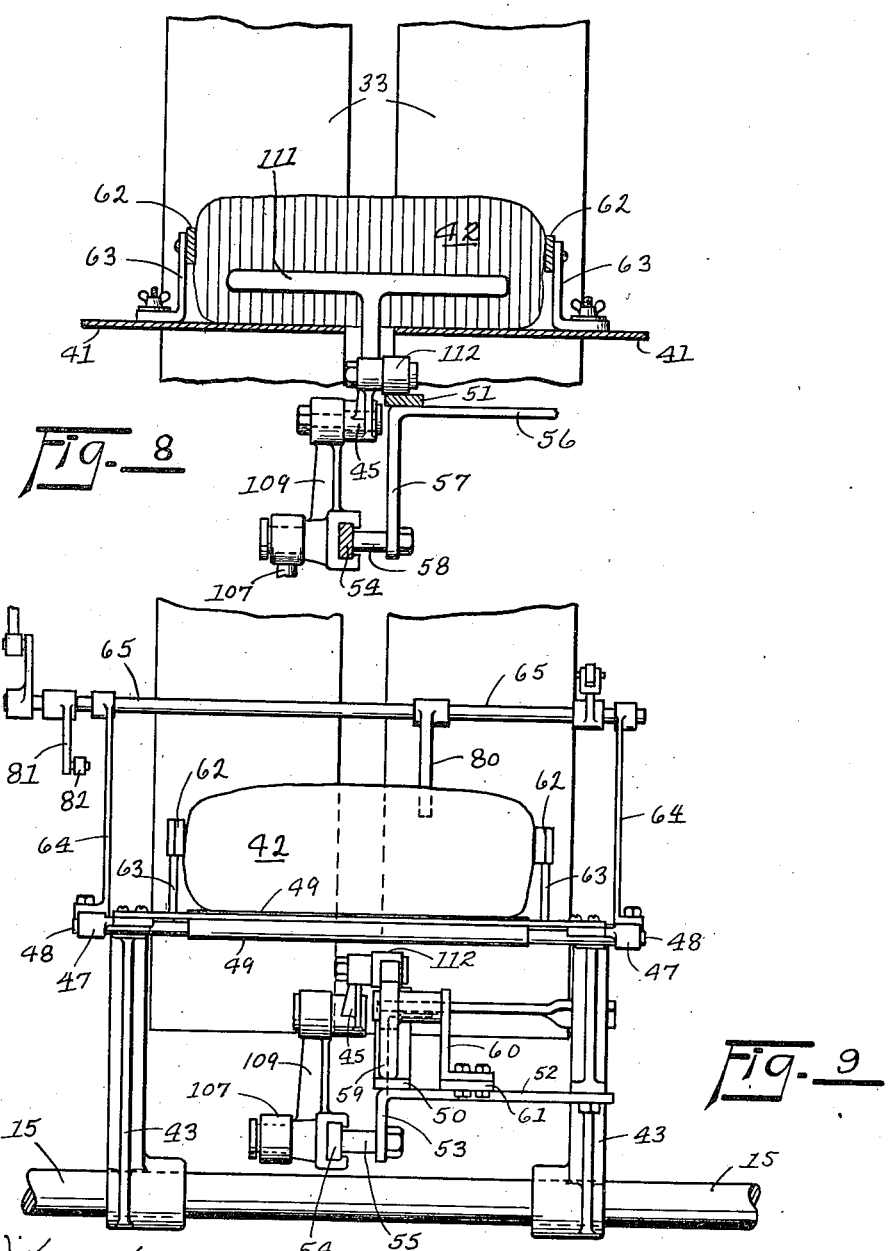

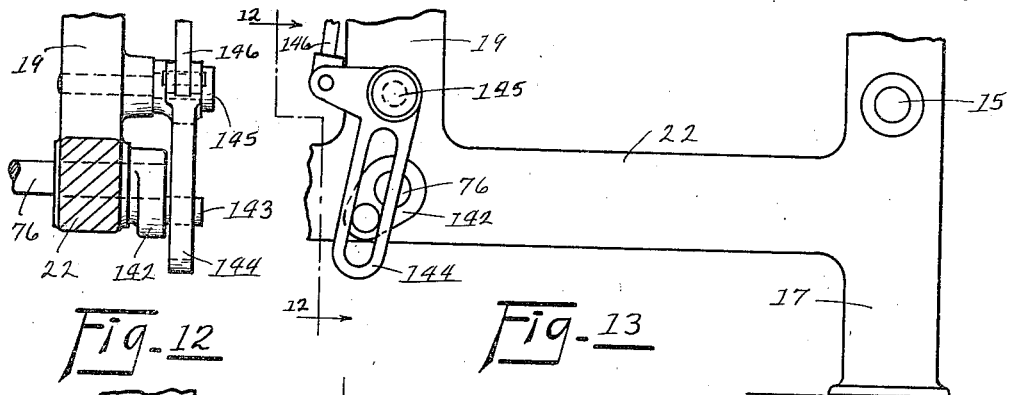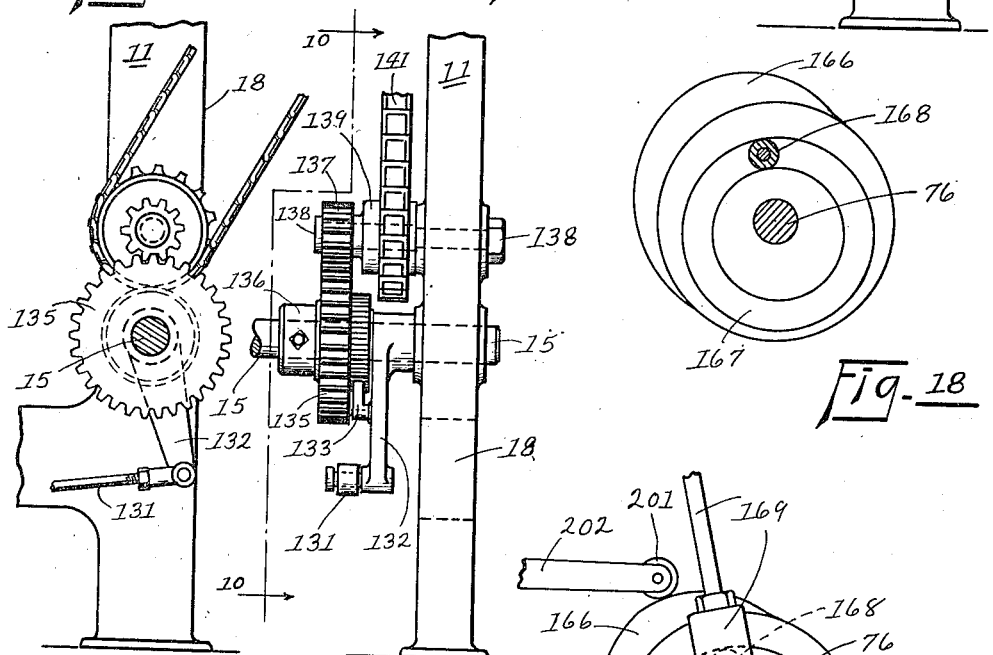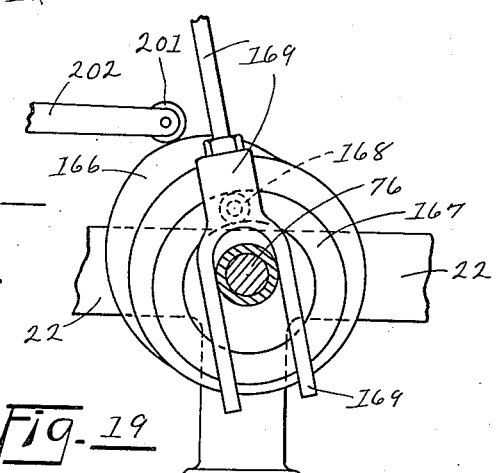

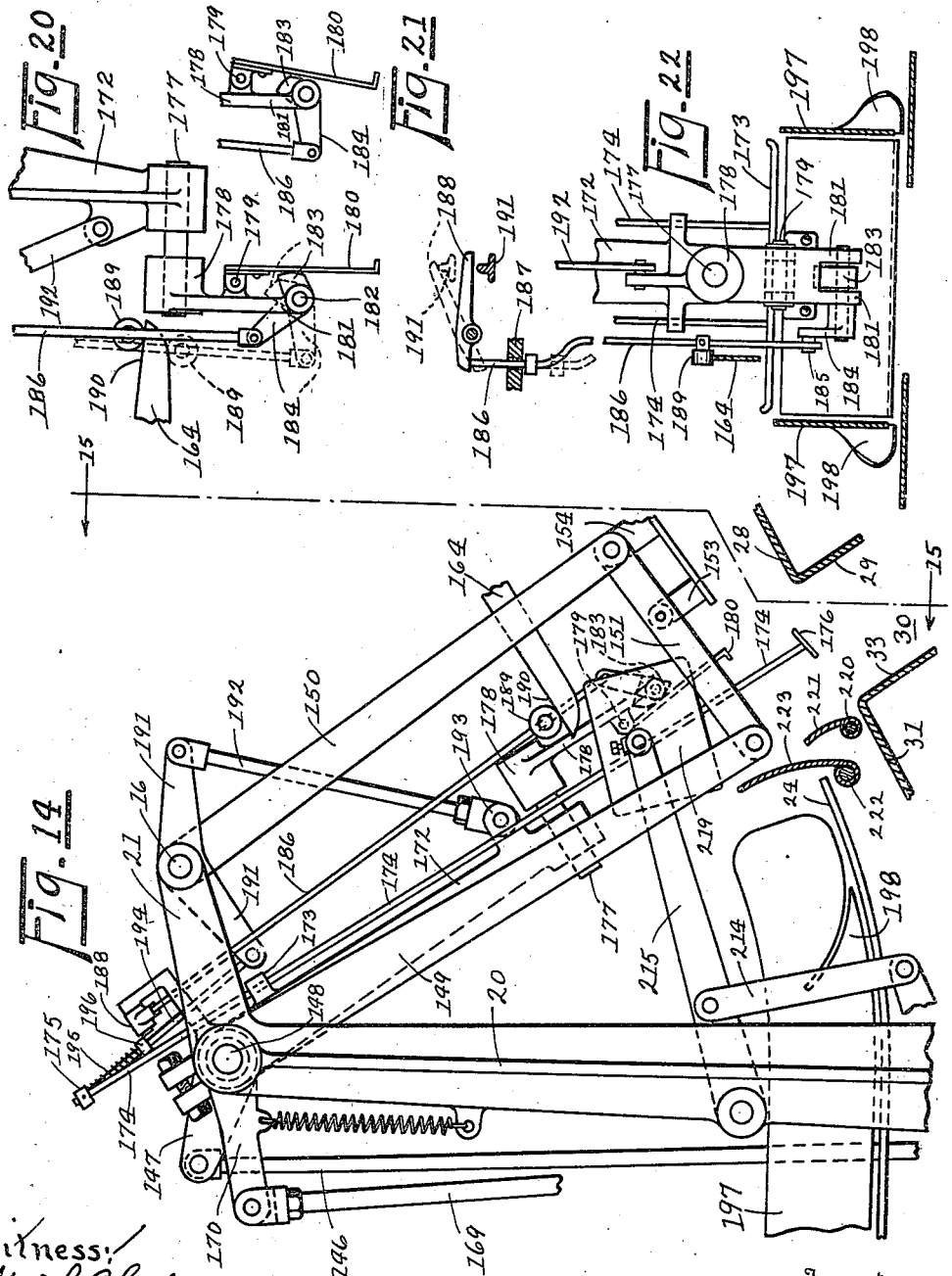

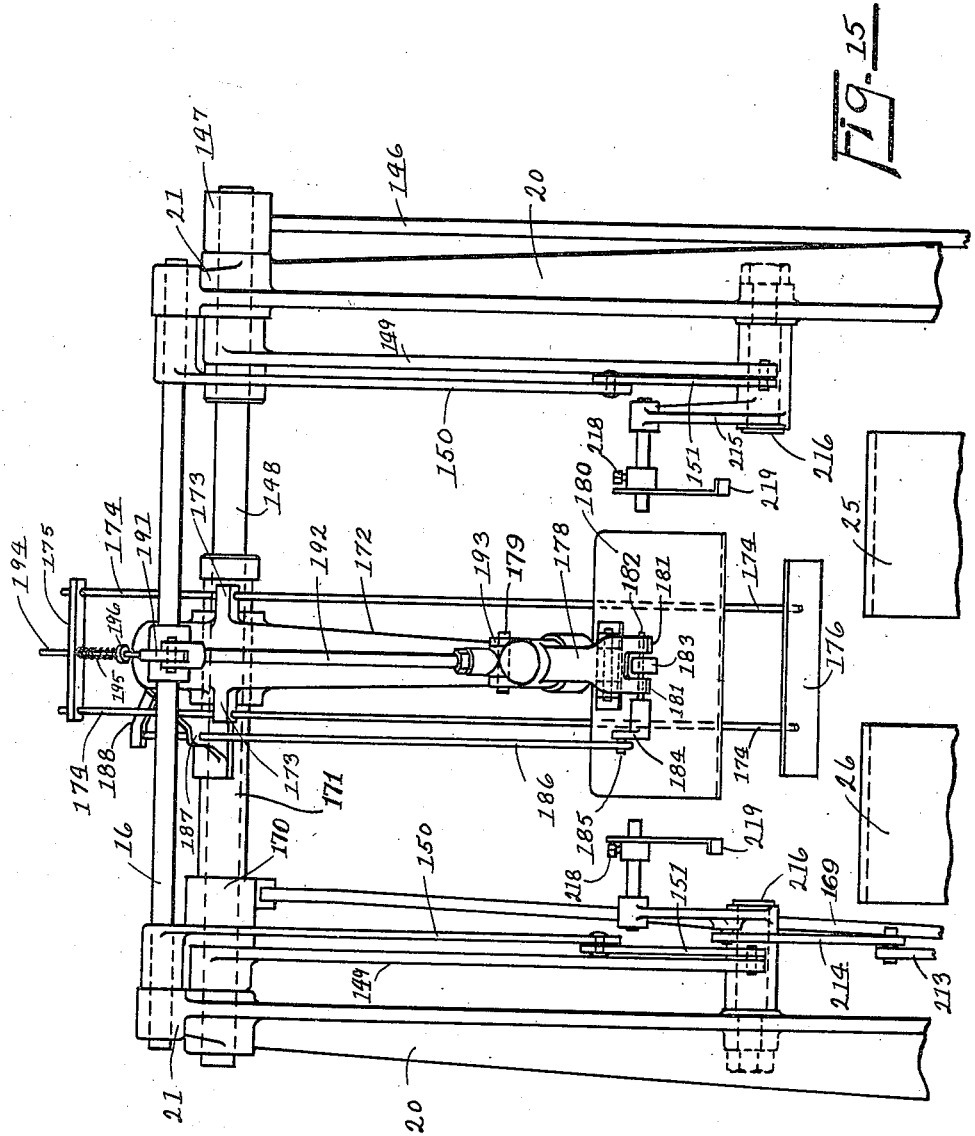

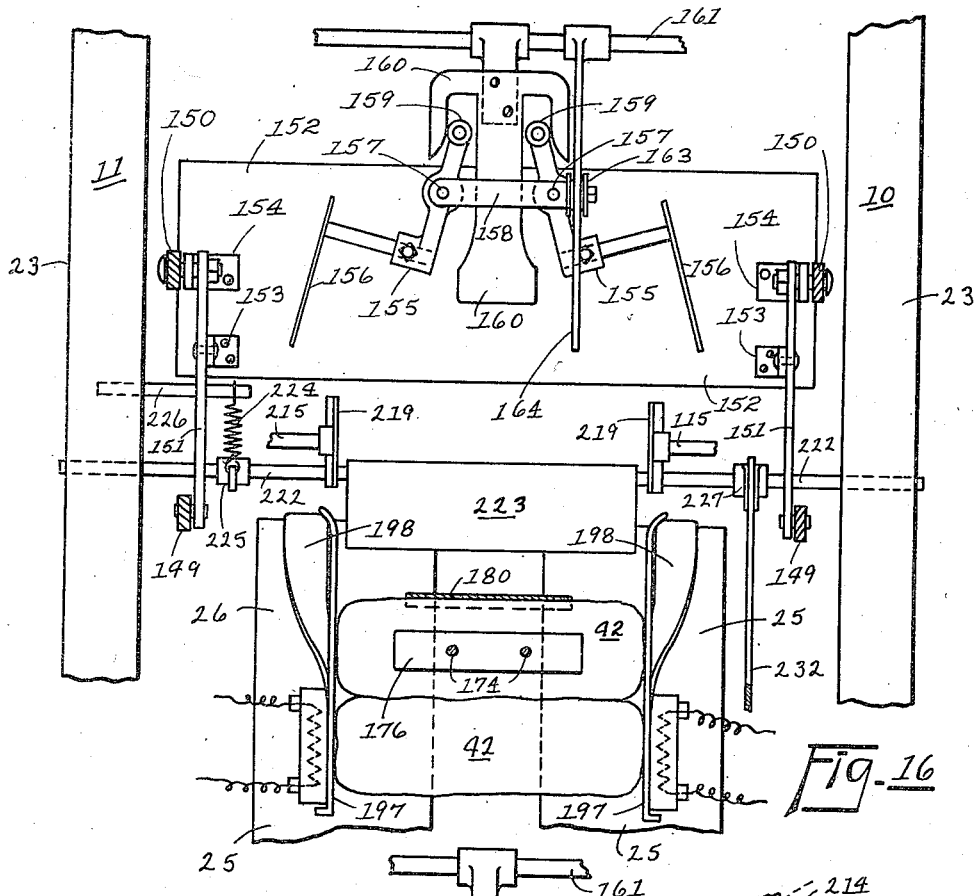

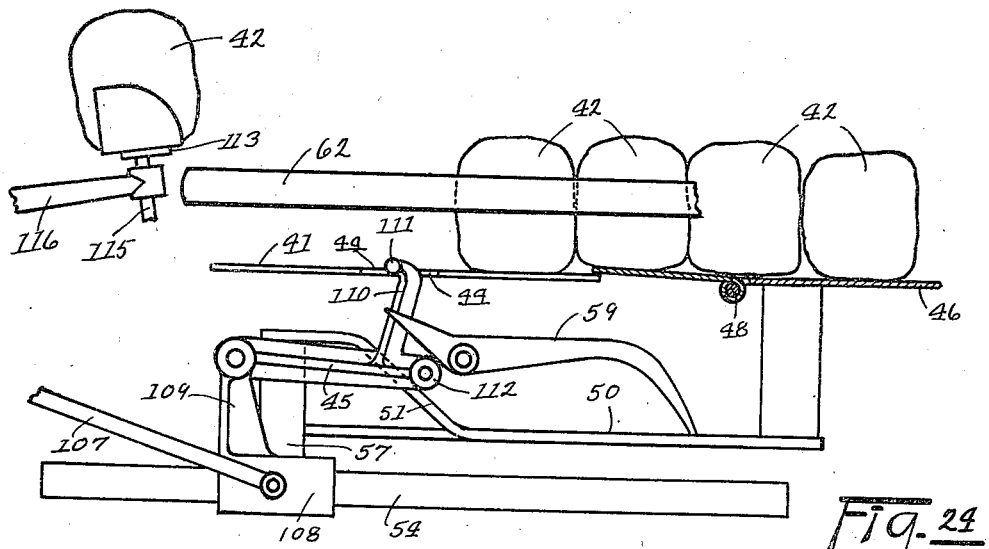
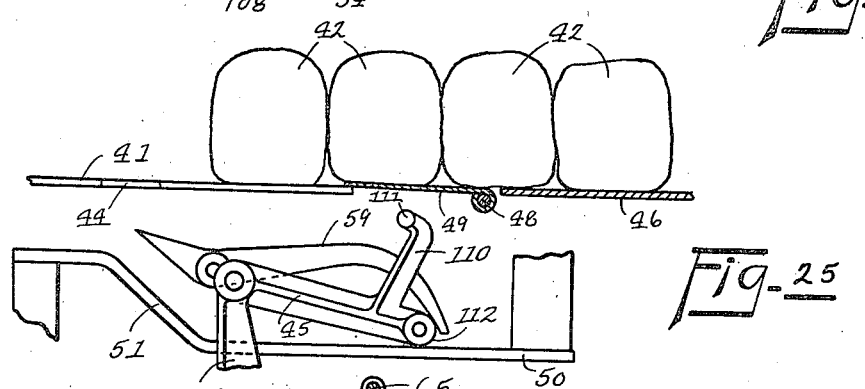
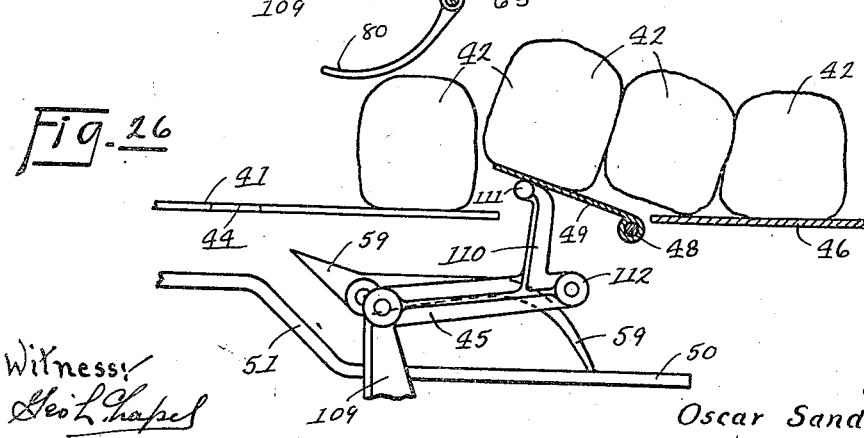

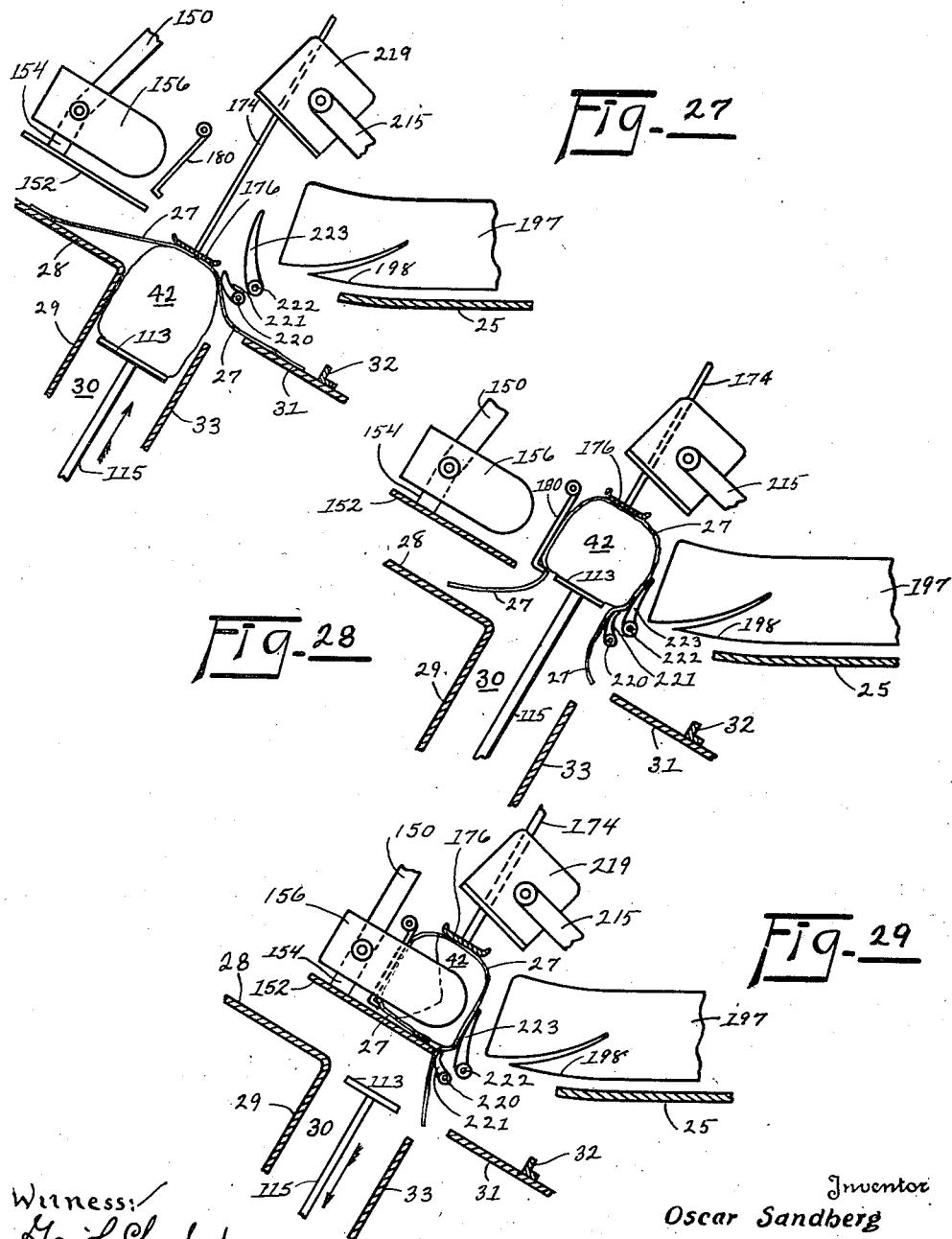

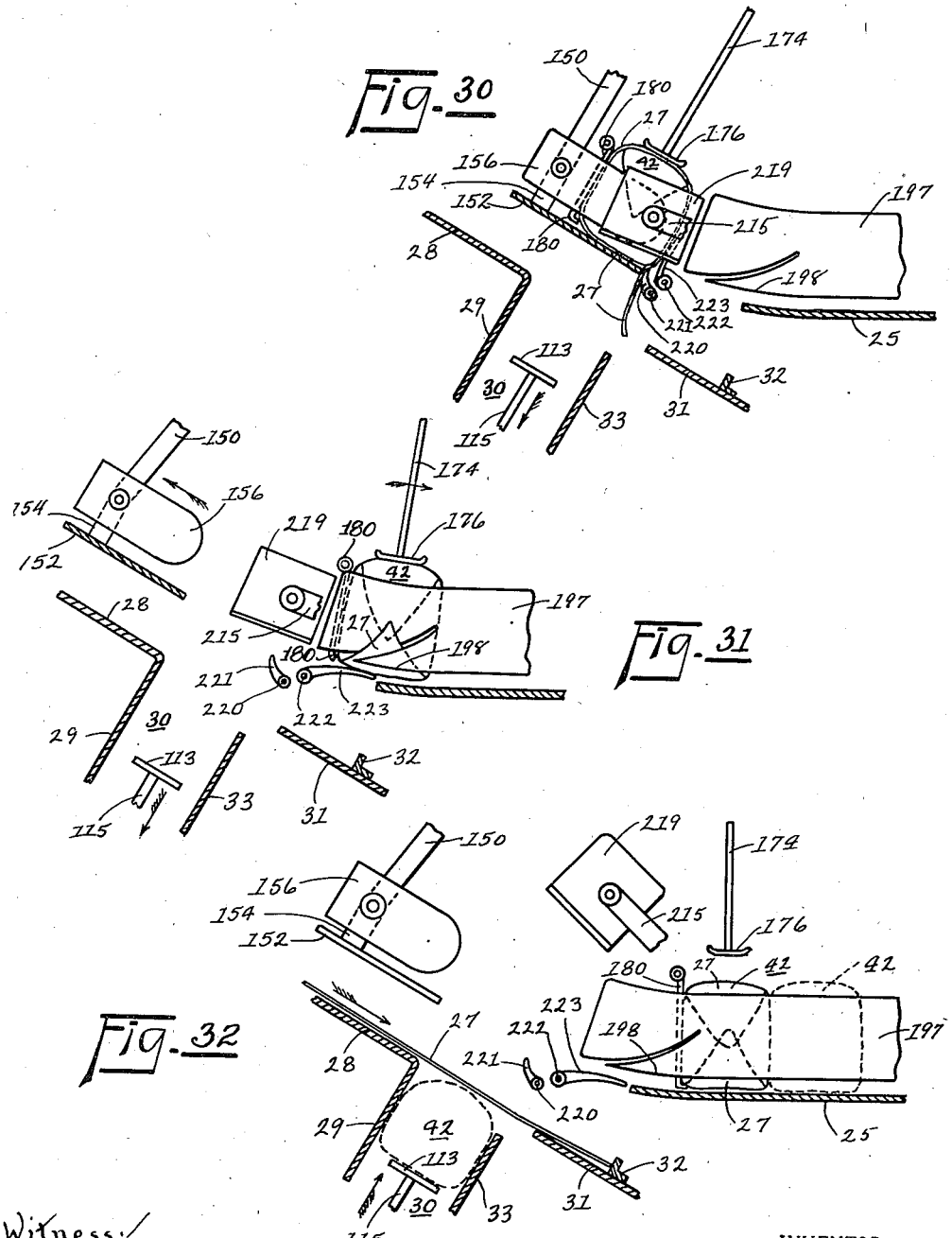

Patented Mar. 1, 1938

2,110,113

UNITED STATES PATENT OFFICE 2,110,113

WRAPPING MACHINERY

Oscar Sandberg, Battle Creek, Mich., assignor, by mesne assignments, to Oliver Machinery Co., Grand Rapids, Mich., a corporation of Michigan Application April 19, 1935, Serial No. 17,225

3 Claims. (Cl. 93—2)

The instant invention relates to wrapping machinery and more particularly to machines especially adapted for use in wrapping either unsliced or pre-sliced loaves of bread.

The primary objects of the present invention are to provide a machine of the character above indicated which effectively, efficiently and economically wraps and seals individual articles such as loaves of bread fed into the machine, either manually or mechanically; to provide such a machine whose several mechanical operations are effected by a common drive shaft operated by a unitary power source; to provide such a machine whose several sequential mechanical operations are synchronously governed by mechanism operatively connected with a common drive shaft in a novel manner; to provide such a machine having novel feed mechanism, efficient wrapping mechanism and sealing mechanism; to provide such a machine whose mechanical operations cease to function when the last fed article has been wrapped and sealed; and, to provide a machine of the general character above indicated which is highly efficient in use and which is relatively economical in construction.

An illustrative embodiment of the invention is shown in the accompanying drawings, wherein:—

Figure 1 is a side elevational view of the machine;

Figure 2 is a sectional view thereof on line 2—2 of Figure 1;

Figure 3 is a forward end elevational view of the machine;

Figure 4 is a sectional view thereof on lines 4—4 of Figures 2, 3 and 5;

Figure 5 is a sectional view thereof on line 5—5 of Figure 4;

Figure 6 is an enlarged fragmentary top plan view of the rearward portion of the machine;

Figure 7 is an enlarged sectional view of the rearward portion of the machine on line 7—7 of Figure 6;

Figure 8 is a sectional view thereof on line 8—8 of Figure 7;

Figure 9 is a rearward end elevational view on line 9—9 of Figure 7;

Figure 10 is an enlarged detail taken on line 10—10 of Figure 11;

Figure 11 is an enlarged detail end elevational view of that portion of the machine shown in Figure 10;

Figure 12 is an enlarged detail sectional view on line 12—12 of Figure 13;

Figure 13 is an enlarged detail side elevational view of that portion of the machine shown in Figure 12;

Figure 14 is an enlarged fragmentary side elevational view of the upper portion of the machine;

Figure 15 is an enlarged forward end elevational view on line 15—15 of Figure 14;

Figure 16 is an enlarged fragmentary top plan view of a portion of the machine;

Figure 17 is an enlarged fragmentary top plan view of a portion of the machine but showing one of the paper folding mechanisms in a different position;

Figure 18 is an enlarged sectional view on line 18—18 of Figure 5;

Figure 19 is an enlarged sectional view on line 19—19 of Figure 5;

Figures 20, 21, 22 and 23 are enlarged detail views of portions of the machine;

Figures 24, 25 and 26 are diagrammatic views showing the feed mechanism in its respective sequential movements; and Figures 27 to 32 are diagrammatic views showing the wrapping mechanism in its respective sequential movements.

Referring to the drawings in which like parts of the operating mechanism and its supporting frame there shown are designated by the same numerals in the several views, the frame generally comprises a pair of identically formed side members 10, 11, here shown as castings, and secured together in parallel spaced relation as by tie rods 12, 13, 14, 15 and 16, the side members each having a front leg 17, a longer rear leg 18, and a medial or central leg 19 having a vertically projecting extremity 20 whose upper end 21 is outwardly formed at an angle between which is secured the tie rod 16, all as best shown in Figures 1, 4 and 14. The legs of each side member are secured together by an integrally cast transverse portion 22 and by the upper transverse portion 23 which rises at an angle rearwardly from the middle leg 19, as best shown in Figures 1 and 2.

A table 24 is supported on the upper surfaces of the angularly disposed portions of the transverse members 23, as best shown in Figure 4, and its horizontally disposed portion is divided into two sections 25, 26, as best shown in Figure 2.

Means for supporting cut lengths of paraffin wrapping paper 27 (Figure 4) comprise the rear forwardly-angularly depending portion 29 forming one side of the loaf elevator opening 30 and the front forwardly-angularly disposed member 31 provided with a paper stop 32 and whose rear side has a rearwardly-angularly depending split apron 33 spaced from the depending portion 29 of the member 28 and forming the other side of the loaf elevator opening 30, as best shown in Figures 4, 14 and in the diagrammatic views, Figures 27–32.

The angularly disposed transverse members 23 are each provided with an angularly extended portion 34 on which are mounted the paper cutter 35 with its operating mechanism and the paper feed rolls 36, 37, and a bracket member 38 mounted upon the upper end of each angularly extended portion 34 has a horizontally disposed forwardly extending slotted arm 39 and a horizontally disposed forwardly extending arm 40, all as best shown in Figures 1 and 4 and whose function is hereinafter particularly described.

A rear table 41 for supporting unwrapped loaves of bread 42, either pre-sliced or unsliced, is supported at a forwardly extending angle by rearwardly extending angularly disposed arms 43 mounted upon the outer ends of the tie rod 15 and an opening 44 is provided therein for the rearwardly-downwardly traveling loaf feed element, generally designated 45. A separate plate 46 likewise providing a table for unwrapped loaves of bread is supported in substantially the same plane as the table 41, its outer forward sides have arms 47 supporting a rod 48 on which is pivotally mounted a plate 49 whose forward end rests upon the rear end of the table 41 and is periodically lifted by the forwardly-upwardly traveling loaf feed element 45, all as best shown in Figures 1, 4, 5–9 and hereinafter particularly described.

Now below the table 41 and the plate 46 is a slide support 50 whose forward end 51 extends upwardly-forwardly and thence downwardly-forwardly for slidably supporting the loaf feed element 45 during its rearward travel, as best indicated in dotted lines in Figure 7 and in the diagrammatic sequential views, Figures 24–26. This slide support 50 is supported at its rear end by the inwardly extending bracket 52 secured to one of the arms 43 and having an angularly projecting end 53 to which is secured a slide bar 54 as by the bolt 55, the forward end of the slide support 51 being supported by a similar bracket 56 forwardly of the bracket 52 and likewise having an angularly projecting end 57 to which is secured the other or forward end of the slide bar 54 as by the bolt 58, all as best shown in Figures 7, 8 and 9.

The bridge cam 59 over and upon which the loaf feed element 45 travels forwardly and which is likewise hereinafter more particularly described, is pivotally supported by the bracket 60 which is secured to the bar 61, as best shown in Figures 7 and 9. A pair of parallel spaced guide members 62 secured to the table 41 as by upwardly extending brackets 63 provide a trough through which the transversely disposed unwrapped loaves of bread 42 start their travel through the machine and a pair of spaced upwardly projecting arms 64 are supported on the table for supporting the rod 65 whose function is hereinafter described.

Unitary means for operating the machine is here shown as an electric motor 66 connected to a pulley wheel 67 by the flexible belt 68, the pulley wheel being rotatably mounted on a stub shaft 69 supported laterally from the front leg 17, the flexible belt 68 permitting of slippage between the motor and the operating mechanism should the machine jam during its operation. This pulley wheel 67 has a sprocket reduction gear wheel 70 fixed therewith carrying a sprocket chain 71 running over a sprocket gear wheel 72 rotatably mounted on the tie rod 13 disposed between the front legs 17 of the side members 10, 11 and which sprocket gear wheel 72 likewise has a sprocket reduction gear wheel 73 fixed thereto. An idler sprocket gear 74 provided with a hub portion having clutch engaging teeth 75 is freely rotatably and slidably mounted upon the drive shaft 76 and a second sprocket chain 77 is carried on the sprocket reduction gear 73 and the idler sprocket gear 74, all as best shown in Figures 1, 2 and 3.

A clutch member 78 provided with teeth adapted to engage and mesh with the clutch engaging teeth 75 on the hub of the idler sprocket gear 74 is fixedly secured to the drive shaft 76 in any conventional manner and includes a hand wheel 79 whereby the machine may be manually operated for adjustment purposes. This clutch 78 is periodically operated by unwrapped loaves of bread 42 as they are fed forwardly on the table 41 between the parallel spaced guide members 62 where they consecutively engage the tiltable finger 80 which rigidly depends from the rod 65 pivotally supported between the spaced upwardly projecting arms 64. As this finger 80 is periodically tilted forwardly and upwardly when engaged by the successively fed unwrapped loaves of bread 42, the depending arm 81 which is rigidly fixed to the end of the rod 65 is likewise caused to swing upwardly and forwardly thereby causing the link rod 82 which is pivotally secured at one end to the outer end of the depending arm 81 and at its other end to the arm 83, to move forwardly. This arm 83 is rigidly secured to the transverse or vertically disposed rod 84 which is rotatably mounted within the spaced bearings 85, 86 secured to the side member 10 of the frame and a lower projecting arm 87 is rigidly fixed to this vertical rod 84 at one end, its other end extending into the peripheral groove 88 of the hub of the idler sprocket gear wheel 74. It will thus be seen that when the finger 80 is tilted or swung forwardly and upwardly by successively fed loaves 42, the clutch 78 is caused to be periodically alternately engaged and disengaged whereby the drive shaft 76 is correspondingly caused to be rotated, all as best shown in Figures 1, 2 and 5.

Sprocket wheels 89, 90 respectively keyed to the drive shaft 76 and rotatable shaft 91 supported between the extended portions 34 carry a sprocket chain 92 which during the rotation of the drive shaft 76 effects rotation of the shaft 91. The outer end of this shaft 91 carries a rigidly fixed arm 93 which periodically engages the laterally extending roller 94 on the upwardly extending arm 95 which is rigidly fixed to the rod 65 as best shown in Figure 1. Thus as the finger 80 for effecting clutch engagement is periodically swung forwardly and upwardly by the successively fed loaves 42, the revolving arm 93 synchronously maintains the finger 80 in forwardly-upwardly swung position until the finger tripping loaf 42 has passed therebelow, thereby preventing dragging of the finger 80 against the top of the loaf 42 to thus cause the loaf to be tipped over.

A pair of spaced arms 96 are pivotally secured at their rear ends to the idler shaft 97 which is rotatably mounted between the extended portions 34 of the side members 10, 11 of the frame and their front ends are respectively pivotally secured to the paper cutting knife blade ends 98 which are freely slidable within the bearings formed in the apertured bosses 99, 100 extending outwardly from the extended portions 34 of the side members 10, 11 of the frame. These arms are further each provided with a medial laterally projecting roller 101 each of which is periodically engaged by the cams 102 rigidly fixed on the opposite ends of the shaft 91 as best shown in Figures 1 and 2. Thus as this shaft 91 is caused to be rotated, these cams 101 periodically engage their respective rollers 100 which elevate the knife blade 35 from its position shown in Figure 1 to its position shown in Figure 4. The knife blade 35 is thereafter permitted to drop by its own weight whereupon the paper 28 for wrapping an individual loaf 42 slides down the paper supporting members 28, 31 to the stop or ledge 32 and over the loaf elevator opening 30 preparatory for use in wrapping an individual loaf 42 in the manner hereinafter set forth in the description of the operation of the machine.

An intermediate sprocket wheel 103 operated by the sprocket chain 92 which rides over it, is keyed to a stub shaft 104 rotatably mounted upon an arm 105 projecting forwardly from the back leg 18 of the side member 10 and a crank arm 106 rigidly secured thereto is pivotally connected at its outer end to one end of a rod 107 whose opposite end is connected to a block 108 oscillatingly-slidably embracing the bar 54 as best shown in Figures 1, 7-9 and in the diagrammatic views, Figures 24-26.

This block is provided with an upwardly extending arm 109 to whose upper end is pivoted an L-shaped loaf feed element 110 (Figure 7) having a T-shaped loaf engaging head 111 (Figure 8) and a laterally projecting roller 112 which is adapted to successively ride on the slide support 51, 50 from the position shown in Figure 7 to the position shown in the diagrammatic view, Figure 24, thence to the position shown in the diagrammatic view, Figure 25, thence reversely upwardly on the bridge cam 59 to the position shown in the diagrammatic view, Figure 26, and finally to the position shown in Figure 7 where the cycle is repeated. Since the bridge cam 59 is pivotally mounted as hereinbefore described, it is caused to assume the several positions indicated in dotted lines in Figure 7 and in the several sequential diagrammatic views, Figures 24-26 during the successively rearward-downward movement of the loaf feed element 45 and its subsequent upward-forward movement where it first lifts the plate 49 and then engages a loaf 42 to move it onto the elevator 113 whose operation is now to be described.

The elevator 113 which periodically receives a loaf 42 fed thereto by the loaf feed element 45 comprises a flat plate substantially the size of the loaf having transversely extending side plates 114 adapted to slidably embrace the loaf 42 as it is fed onto the elevator 113, the plate on which the loaf rests being provided with a depending rod 115 which is rigidly secured to the arm 116, all as best shown in Figures 4-7. The opposite end of this arm 116 pivotally embraces the tie rod 13 between the collars 117, 118 and is provided with a laterally projecting roller 119 which rides upon the cam 120 rigidly fixed to the drive shaft 76, as best shown in Figures 3-5.

The arm 116 is thus caused to be alternately periodically elevated and dropped by the cam 120 between the split apron 33 and in properly synchronized relation with the loaf feed element 45 and with the cutting action of the paper knife blade 35 which synchronized upward travel of the arm 116 effects an upward travel of the elevator 113 and its supported loaf 42 interjacent the split apron 33. The loaf 42 to be wrapped is thus elevated through the loaf elevator opening 30 from the position shown in full lines in Figure 4 to the position shown in dotted lines therein, the top surface of the loaf 42 engaging the under surface of the previously cut length of paper 27 which in turn is caused to embrace the top and opposite sides of the loaf 42 in the first wrapping operation as best shown in the diagrammatic sequential views, Figures 27, 28, all as hereinafter set forth in the description of the operation of the machine.

Means for feeding the paraffin wrapping paper 121 on the idler roller 122 supported between the bifurcated ends of the bracket 38 (Figure 1) over the spring tensioned roller 123 supported within the oppositely disposed spaced slotted fingers 39, thence over the roller 124 on the idler shaft 97 supported between the extended portions 34 of the side members 10, 11 and between the similarly supported and positively actuated feed roller 36 and its similarly supported weight-engaging roller 37 above the paper cutting knife blade 35 and onto the angularly disposed members 28, 31 over the loaf elevator opening 30 (Figure 4) comprises a cam 127 rigidly secured on the drive shaft 76 and whose cammed surface periodically engages the laterally projecting roller 128 on the spring tensioned depending finger 129 which is pivotally secured at its upper end to a stub shaft 130 supported by the medial leg 19 as shown in Figures 2, 4 and 5.

Pivotally secured to the other end of the finger 129 is a rod 131 whose other end is secured to the end of a ratchet crank arm 132 which pivotally depends from the tie rod 15. The ratchet crank arm 132 is provided with a spring tensioned ratchet pawl 133 which is adapted to engage the spur gear 134 lying adjacent to and in fixed relation to the larger spur gear 135 which is rotatably mounted on the tie rod 15 between the collar 136 and the ratchet arm 132, which pawl 133 is thus caused to intermittently rotate the spur gear 135 with each alternate oscillation of the rod 131 whose oscillating movement is induced by the cam 127. The spur gear 135 meshes with the reduction spur gear 137 fast on the stub shaft 138 extending inwardly from the rear leg 18 of the side member 11 and which reduction spur gear 137 is integrally formed or otherwise to its companion and larger sprocket gear 139, all as best shown in Figures 4, 10 and 11.

The shaft of the positive paper feed roller 36 is likewise provided with a rigidly fixed sprocket gear 140 and a sprocket chain 141 rides over and upon the sprocket gears 139, 140 (Figures 2, 4, 10 and 11) whereby the positive paper feed roller 36 is intermittently rotated in synchronization with the operation of the fed and elevated loaf 42 and in synchronization with the cutting action of the paper cutting knife blade 35, all as hereinafter set forth in the description of the operation of the machine.

Secured to the outer end of the drive shaft 76 is a crank 142 having a laterally extending pin 143 slidably disposed within a slotted bell crank lever 144 pivotally mounted upon a stub shaft 145 secured to and laterally extending inwardly from the medial leg 19 of the side member 11 of the frame, all as best shown in Figures 2, 3, 5, 12 and 13. To the other end of the bell crank lever 144 is pivotally secured a rod 146 whose other end is pivotally secured within a crank yoke 147 integrally formed with a rock shaft 148 supported between the vertically projecting extremities 20 of the middle leg 19 of the side members 10, 11 of the frame as best shown in Figures 1, 3, 13–15. Thus as the drive shaft 76 is caused to be rotated, the rock shaft 148 is caused to oscillate.

A pair of spaced depending arms 149 are rigidly secured to the oscillating rock shaft 148 adjacent its opposite ends and inside the vertically projecting extremities 20 of the two middle legs 19 of the side members 10, 11 and a pair of similarly spaced depending arms 150 are pivotally secured to the tie rod 16 adjacent its outer ends and inside the angularly projecting ends 21 of the vertically extending extremities 20 of the middle legs 19, a link 151 being pivotally connected at its opposite ends to each set of the spaced depending arms 149, 150, all as best shown in Figures 1, 3, 4, 14 and 15.

A depending plate 152 for folding the paper 27 against a portion of the bottom of the loaf 42 as hereinafter particularly described is provided with a pair of spaced angle iron brackets 153, 154 on its opposite sides, to each of which pair is secured the link 151. A pair of spaced arms 155 whose forward ends are provided with side plates 156 for folding the paper 27 over the opposite ends of the loaf 42 as hereinafter described, are pivotally connected to the plate substantially medially of their lengths by transverse pins 157 whose upper ends are connected together by the bridge link 158. The rearward ends of these spaced arms are provided with transverse rollers 159 which engage the opposite sides of the T-member 160, which is rigidly secured to the tie rod 161, during the swinging movement of the plate 152 from the position shown in Figure 16 to the position shown in Figure 17. Thus as the rock shaft 148 is caused to be oscillated, the plate 152 is caused to correspondingly swing whereupon the rollers 159 which engage the opposite sides of the T-member 160 alternately swing the side plates 156 inwardly toward each other from the position shown in Figure 16 to the position shown in Figure 17.

The link bridge 158 is provided with a rigidly fixed upwardly extending arm 162 to whose free end is mounted a roller 163, and a finger 164 having a cammed bottom edge 165, engaged by the roller 163 for elevating the forward or free end of the finger 164 for the purpose hereinafter set forth, is pivotally connected to the tie rod 161, all as best shown in Figures 1, 4, 14, 16 and 17.

The drive shaft 76 is further provided with a rigidly fixed dual cam element having a peripheral web cam 166 and an axial cam or track 167 within which is a roller 168 projecting laterally from a bifurcated arm 169 slidably and rotatably embracing the drive shaft 76 as best shown in Figures 18 and 19. The upper end of this arm 169 is pivotally connected to the projecting arm 170 rigidly fixed to the rock sleeve 171 which oscillatingly embraces substantially one-half the length of rock shaft 148, all as best shown in Figures 3, 4 and 15.

This rock sleeve 171 is provided with a depending arm 172 rigidly fixed therewith adjacent its inner end and from which extends on opposite sides an upper plate 173 whose respective opposite ends are provided with bearing apertures for the spaced slidable rods 174 to whose upper ends is rigidly fixed a cross bar 175 and to whose lower ends is rigidly fixed a plate 176 which engages the loaf wrapping paper 27 on the top side of the loaf 42 as it emerges through the loaf elevator opening 30, all as best shown in Figures 1, 3, 4 and 14 and in the diagrammatic views, Figures 27–32, for the purposes hereinafter set forth in the description of the operation of the machine.

The lower end of the depending arm 172 is provided with a laterally-rearwardly extending portion 177 to whose outer end is secured a depending extension 178 having a bifurcated lower end through which an oscillatable pin 179 extends transversely and from which pin 179 pivotally depends a pusher plate 180 having a lower forwardly flanged portion (Figures 14, 15, 20–22) which initially engages the rear side and bottom of the loaf 42 for temporarily supporting it and subsequently causes the loaf 42 to be moved forwardly during the forward swinging movement of the depending arm 172 whose forward swinging movement is governed by the cam actuated rock sleeve 171.

This extension 178 has a second and lower depending bifurcated portion 181 through which extends a transverse oscillatable pin 182 provided with (1) a cam element 183 disposed between its bifurcated ends adapted to engage the rear side of the pusher plate 180 in its forwardly tilted position and (2) with a crank 184 fixed to one of its outer ends as best shown in Figures 14, 15, 20–22.

This crank arm 184 has a projecting pin 185 to which is pivotally secured an upwardly extending rod 186 whose upper end is slidable through an aperture in an angle iron plate 187 rigidly fixed to the rock sleeve 171 (Figure 15), the upwardly extending portion of the plate 187 having a double ended arm 188 pivotally mounted thereon medially of the length of the arm 188.

A projecting roller 189 mounted on the rod 186 is engaged by the cammed upper edge 190 of the forwardly projecting finger 164 as the depending arm 172 is swung rearwardly in synchronization with the forwardly swinging plate 152 which movement of the plate 152 causes the forward end of the finger 164 to pivotally elevate on its roller 163, engaging the cammed bottom edge 165 of the finger 164. The rod 186 is thus lifted which causes the cam element 183 to be rotated through its crank 184 against the pivoted pusher plate 180 (Figures 20–22), the upper end of the rod 186 engaging one end of the double ended pivoted arm 188 (Figures 15, 21).

A bell crank lever 191 pivotally mounted on the tie rod 16 is pivotally connected at its rear end to a depending link 192 whose other end is pivotally connected to a projecting lug 193 integrally formed with the depending arm 172, the forward end of the bell crank lever 191 being pivotally connected to an upwardly extending rod 194 which slidably passes through an aperture medially of the length of the cross bar 175, a coiled expansion spring 195 being interposed between the collar 196 and the bottom side of the cross plate 175, all as best shown in Figures 1, 4, 14 and 15.

Thus it will be seen that as the arm 172 which depends from the rock sleeve 171 swings forwardly, the forward end of the bell crank lever 191 lifts the plate 176 from its engagement with the loaf wrapping paper on the top side of the loaf 42 and likewise engages the end of the pivoted double ended arm 188 whose opposite end is thus caused to engage and depress the rod 186 to release the cam 184 from its engagement with the back side of the pusher plate 180, the synchronization being hereinafter set forth in the description of the operation of the machine.

The split table 25, 26 is provided with a pair of parallel spaced rigidly fixed upstanding and electrically wired heat plates 197 for sealing the paraffin wrapping paper 27 after the paper has been wrapped over the ends of the loaf 42, the rear ends of the plates 197 being upwardly arcuately split and the portion 198 of each of the plates below the split being folded downwardly and outwardly for making one of the paper folds as hereinafter described and as best shown in Figures 2, 4 and 16 and in the diagrammatic views, Figures 23–28.

A pair of parallel spaced upstanding plates lineally disposed relative to the hot plates 197 are mounted forwardly of the hot plates 197, the plate 199 being rigidly fixed to the table 26 and the plate 200 being laterally swingably secured to the table 25, said pairs of spaced parallel and lineally disposed plates 197, 199, 200 forming a trough for the final travel of the loaves 42 after they have been wrapped, all as best shown in Figures 1–4.

The peripheral web cam 166 engages a roller 201 at the rear end of the arm 202 which is pivotally mounted upon the stub shaft 69 and a vertically extending rod 203 pivoted to the arm 202 is thus caused to vertically oscillate during the rotation of the web cam 166. The other end of this rod 203 is pivotally connected to one end of a bell crank lever 204 which is pivotally mounted on the bracket 205 (Figure 3) and the other end of the bell crank lever 204 is pivotally connected to one end of a link 206 whose other end is pivotally connected to a vertically disposed hinge member 207 secured to the swingable plate 200 (Figure 1). Thus as the web cam 166 is caused to be rotated on the drive shaft 76 to which it is rigidly fixed, the plate 200 is caused to alternately and periodically swing from the position shown in full lines in Figure 2 to the position shown in dotted lines in Figure 2 for the purpose of intermittently compressing the ends of the wrapped loaves 42 during their forward travel to better insure a fixed seal after the paper 27 has been initially sealed by the spaced parallel hot plates 197.

The drive shaft 76 is further provided with a cam 208 rigidly fixed thereto and a bifurcated arm 209 oscillatingly slidably embracing the drive shaft 76 is provided with a projecting roller 210 which rides upon the cam 208. The upper end of this arm is pivotally connected to a crank 211 which is rigidly secured to a rock shaft 212 and to each of the opposite ends of this rock shaft 212 is rigidly secured a crank 213 to each of whose outer ends is pivotally connected a link 214. The upper end of each link 214 is pivotally secured intermediate the ends of a cross link 215 whose forward ends are each pivotally connected to an inwardly extending stub shaft 216 and whose rearward ends are provided with an opening through which projects an inwardly extending rod 217 adjustably secured laterally by the set screw 218.

The inner ends of each rod 217 are provided with a vertically disposed plate 219 for folding the wrapping paper 27 over the loaf 42 as hereinafter described, all as best shown in Figures 2–5. Thus it will be seen that as the cam 208 is caused to be rotated, the plates 219 are caused to oscillatingly swing alternately arcuately upwardly and downwardly.

A rod 220 pivotally secured between the side members 10, 11 of the frame immediately below and adjacent the forward side of the loaf elevator opening 30 is provided with a rigidly fixed upwardly-angularly disposed apron 221, which as the loaf 42 ascends through the loaf elevator opening 30, is engaged by the forward side of the loaf 42 and is swung forwardly but when the bottom of the loaf 42 clears the apron 221, the apron swings in the opposite direction to engage the bottom side of the loaf 42 and prevent it from dropping through the opening 30 when the elevator 113 subsequently descends (Figures 27–32).

Above the rod 220 and adjacent the rear end of the forward table 24, is a parallel rod 222 likewise pivotally supported between the side members 10, 11 of the frame and to which is rigidly secured a plate 223 which plate is normally tensionally urged upwardly by the spring 224 interposed between the rod hook 225 and the inwardly extending arm 226 fixed to the frame (Figure 16) which plate 223 engages the forward side of the loaf 42 or the side of the loaf opposite the pusher plate 180 upon elevation of the loaf 42 through the loaf elevator opening 30 (Figures 27–32) and which plate 223 is caused to be moved downwardly during the forward movement of the plate 152 when the loaf 42 is moved forwardly onto the table 24 from the position shown in diagrammatic view, Figure 30, to the position of the loaf 42 shown in the diagrammatic view, Figure 31.

The end of this rod 222 opposite the rod hook 225 is provided with a rigidly fixed laterally extending arm 227 (Figures 1, 23) and a bell crank lever 228 pivoted to a stub shaft 229 extending inwardly from the side member 10 has a hooked end 230 engaging the arm 227 to periodically hold the plate 223 downwardly against spring tension and to release its hooked end 230 when the laterally extending pin 231 on the arm 169 engages the other end of the bell crank lever 228 in the downward travel of the arm 169. An arm 232 pivotally secured on the inside of the side member 10 and above the bell crank lever 228 is periodically elevated by the oscillating cam 233 on the rock shaft 212 and alternately permitted to drop by its own weight with its free end alternately engaging and disengaging the arm 227 to tightly and momentarily hold the loaf 42 between the pusher plate 180 and the plate 223 all as best shown in Figures 1, 23, 27–32, immediately before the loaf 42 is moved from the position shown in the diagrammatic view, Figure 30, to the position of the loaf 42 shown in the diagrammatic view, Figure 31.

*Operation*

In operation, the switch (not shown) in the electric motor circuit is first closed, whereupon the mechanism to the clutch 74 on the drive shaft 76 is set in operation.

Loaves of unwrapped bread fed onto the rear table 46 transversely of the trough formed by the spaced upstanding guide members 62, manually if desired when the unwrapped loaves are unsliced and power fed directly from a slicing machine when the loaves are pre-sliced, consecutively and periodically engage the finger 80 which causes the teeth on the clutch 74 to engage the teeth 75 on the hub 78 fast on the drive shaft 76, whereby the drive shaft is caused to be rotated as hereinbefore particularly described.

The rear side of a loaf 42 is thus engaged by the T-arm 111 of the loaf feed 45 as it is elevated through the opening formed by the rearwardly-upwardly tilting plate 49 as diagrammatically illustrated in Figure 26 and as the feed element 45 rides upwardly on the bridge cam 59, the individual loaf is moved forwardly onto the elevator 113 whose loaf receiving position as shown in Figure 7 is synchronized with the forward movement of the loaf feed 45 slidable on the bar 54 and driven by the rod 107 connected with the chain driven crank 106 as hereinbefore particularly described.

As the elevator 113 is swung upwardly-forwardly from the position shown in full lines in Figure 4 to the position shown in dotted lines of the same view by means of the cam actuated arm 116 and thereafter again descends in the manner hereinbefore described, the loaf feed element is synchronously consecutively moving from the position shown in Figure 7 in full lines to the various positions therein shown in dotted lines, or to the position shown in Figure 24, thence to its position shown in Figure 25, and thence to the initial position shown in Figure 26, whereupon the cycle is repeated with the engagement of the clutch operating finger 80 by the following loaf of bread and as hereinbefore particularly described.

As a given loaf thus ascends through the elevator opening 30 as shown in dotted lines in Figure 4 to its position shown in the diagrammatic view, Figure 27, the top of the loaf engages the under side of the paper 27 which has been previously and synchronously cut by the cam actuated knife blade 35 (Figures 1 and 4) as hereinbefore particularly set forth.

As the top of the loaf thus engages the under side of the pre-cut paper 27, the arm 172 depending from the cam actuated rock sleeve 171 is synchronously swung rearwardly whereupon the plate 176 depending from the slidable rods 174 is caused to drop and engage the top surface of the pre-cut paper 27 above the top of the loaf and by its weight prevent the paper from slipping, all as hereinbefore particularly set forth.

The loaf is further elevated from its position shown in the diagrammatic view, Figure 27, to the position shown in the diagrammatic view, Figure 28, in which position the paper 27 has been folded downwardly on the front and rear sides of the loaf as there illustrated, respectively by the pivoted apron 223 and by the pusher plate 180 which immediately before its synchronized forward swinging movement with its cam actuated rock sleeve 171 from which it pivotally depends, is caused to be tilted from its position shown in Figure 21 to the position shown in Figure 20 by the forward end of the cam elevated finger 165 engaging under the roller 189 (Figures 1, 4, 14) which controls the position of the cam 183 as hereinbefore particularly described.

The plate 152 and its cam actuated swinging side plates 156 suspended from the pairs of links 149, 150 depending from the cam actuated rock shaft 148 are consecutively synchronously swung forwardly from their position shown in the diagrammatic view, Figure 28, to the position shown in the diagrammatic view, Figure 29, the plate 152 making the forward fold of the paper under the bottom of the loaf and the side plates 156 making the forward fold of the paper over the rear vertical side edges of the loaf as the elevator 113 starts to descend, the swinging cam actuated movements being hereinbefore particularly set forth and described.

While the elevator descends still further and before this plate 152 and the side plates 156 are caused to be again swung rearwardly by the cam actuated rock shaft 148 and its depending pairs of arms 149, 150 from which the plate 152 and side plates 156 are suspended, the spaced plates 219 are synchronously cam actuated downwardly from their position shown in the diagrammatic view, Figure 29, to the position shown in the diagrammatic view, Figure 30, the movement of the cam actuated plates being hereinbefore specifically set forth. Thus as these spaced plates 219 are thus moved downwardly, they engage the paper to make the downward fold over the upper side edges of the loaf as shown in this diagrammatic view, Figure 30.

As the plate 152 and side plates 156 are next synchronously swung rearwardly from their position shown in the diagrammatic view, Figure 30, to their position shown in the diagrammatic view, Figure 31, the pusher plate 180 is synchronously caused to be swung forwardly with the forwardly swinging movement of its supporting arm 172 depending from the cam actuated rock sleeve 171, said cam actuated movements having been hereinbefore specifically set forth.

As the loaf 42 is thus delivered to rear end of the split table 25, 26 as shown in the diagrammatic view, Figure 31, the normally upwardly spring urged plate 223 is engaged by the bottom edge of the pusher plate 180 and swung downwardly where it is held in the engaged position as shown in full lines in Figure 31 and as hereinbefore described.

During this forward travel of the loaf from its position shown in Figure 30 to its position shown in Figure 31, the rear end edges of the hot plates 197 first engage the paper 27 for making the rearward fold of the paper over the front vertical side edges of the loaf and thereafter the rear end of the split table 25, 26 engages the forward hanging portion of the paper 27 making the rearward fold of the paper under the bottom of the loaf, the upwardly arcuate slit rear ends of the hot plates 197 with their downwardly folded lower portions 198 (Figure 16) making the upward side fold of the paper in the manner shown as the loaf travels from its position shown in the diagrammatic view, Figure 31, to the position of the loaf shown in the diagrammatic view, Figure 32.

During this forward travel of the loaf from its position shown in Figure 31 to its position shown in Figure 32, the plate 176 is caused to be synchronously swung forwardly-upwardly from the top of the wrapped loaf during the forwardly swinging movement of the cam actuated rock sleeve 171, the plates 219 having likewise been synchronously swung forwardly and upwardly by the cam actuated rock arm 212 and its connections therewith and the elevator 113 having started its ascent with another loaf 42 which has tripped the finger 80 to effect clutch engagement whereupon the cycle in its synchronized sequence is repeated.

As the opposite ends of each consecutive loaf pass by the hot plates 197, the paraffin paper is sealed thereby and the cam actuated swinging plate 200 thereafter periodically clamps the opposite ends of each loaf as it travels forwardly to insure a better and more perfect seal.

It will thus be seen that the machine herein shown and described effectively, efficiently and economically wraps and seals individual articles such as loaves of bread fed into the machine, either manually or mechanically; that the several mechanical operations of the machine are effected by a common drive shaft operated by a unitary power source; that the several sequential mechanical operations are synchronously governed by mechanism operatively connected with a common drive shaft in a novel manner; that the machine has novel feed mechanism, efficient wrapping mechanism, and effective sealing mechanism; that the mechanical operations of the machine cease to function when the last fed article has been wrapped and sealed; and, that the machine herein shown and described is both highly efficient in use and is relatively economical in construction.

While but one specific embodiment of the invention has been herein shown and described, it will be understood that numerous details of the construction shown may be altered or omitted without departing from the spirit of this invention as defined by the following claims.

I claim:

1. In a wrapping machine having a drive shaft, a horizontally disposed table having an opening therethrough at the rear end thereof adapted for supporting a pre-cut wrapping sheet over the opening and for supporting a pair of spaced guides at the forward end thereof whose rear ends are provided with upwardly-forwardly arcuate slots, an elevator disposed below said opening adapted for supporting an article to be wrapped, a normally upwardly urged clamping plate pivotally mounted adjacent the forward side of the opening, a pusher plate swingable to a position adjacent the rearward side of the opening and in spaced parallel relation with the clamping plate, a bottom plate provided with a pair of spaced transversely disposed plates swingable to a position wherein the bottom plate is disposed below the clamping plate and the pusher plate and its spaced transverse plates are disposed adjacent the opposite ends of the clamping plate and the pusher plate, a pair of spaced side plates downwardly swingable adjacent the opposite ends of the clamping plate and pusher plate, and synchronous mechanism operatively connecting the drive shaft with the elevator, clamping plate, pusher plate, bottom plate, and spaced side plates for sequentially causing the elevator to ascend through the opening and deliver its supported article between the embracing inside surfaces of the parallel spaced clamping and pusher plates for wrapping the top and opposite side portions of the article, thereafter causing the bottom plate to be swung to a position below the clamping and pusher plates, and after the descent of the elevator for wrapping the bottom rearward portion and the opposite rearward end portions of the article, thereafter causing the pair of spaced side plates to be swung downwardly adjacent the opposite ends of the clamping plate and pusher plate, and after the rearward swinging movement of the bottom plate for wrapping the opposite top end portions of the article, and thereafter causing the pusher plate to move the article forwardly over the forwardly folding clamping plate and over the forward side edge of the opening for wrapping the bottom forward portion of the article, the continued forward movement of the pusher plate moving the article between the rear ends of the spaced guides for wrapping the opposite forward end portions of the article, the opposite upwardly-forwardly arcuate slots through which the remaining unfolded ends of the paper pass causing these unfolded ends to be folded upwardly for wrapping the opposite bottom end portions of the article.

2. In a wrapping machine having a drive shaft, a horizontally disposed table having a downwardly-forwardly angularly disposed rear portion provided with an opening therethrough and a horizontally disposed forward portion, said angularly disposed portion being adapted for supporting a pre-cut wrapping sheet over said opening and said forwardly disposed portion supporting a pair of spaced guides whose rear ends are provided with upwardly-forwardly arcuate slots, an elevator disposed below said opening adapted for supporting an article to be wrapped, a normally upwardly urged clamping plate pivotally mounted adjacent the forward side of the opening, a pusher plate swingable to a position adjacent the rearward side of the opening and in spaced parallel relation with the clamping plate, a bottom plate provided with a pair of spaced transversely disposed plates swingable to a position wherein the bottom plate is disposed below the clamping plate and the pusher plate and its spaced transverse plates are disposed adjacent the opposite ends of the clamping plate and the pusher plate, a pair of spaced side plates downwardly swingable adjacent the opposite ends of the clamping plate and pusher plate, and synchronous mechanism operatively connecting the drive shaft with the elevator, clamping plate, pusher plate, bottom plate, and spaced side plates for sequentially causing the elevator to ascend through the opening and deliver its supported article between the embracing inside surfaces of the parallel spaced clamping and pusher plates for wrapping the top and opposite side portions of the article, thereafter causing the bottom plate to be swung to a position below the clamping and pusher plates, and after the descent of the elevator for wrapping the bottom rearward portion and the opposite rearward end portions of the article, thereafter causing the pair of spaced side plates to be swung downwardly adjacent the opposite ends of the clamping plate and pusher plate, and after the rearward swinging movement of the bottom plate for wrapping the opposite top end portions of the article, and thereafter causing the pusher plate to move the article forwardly over the forwardly folding clamping plate and over the forward side edge of the opening for wrapping the bottom forward portion of the article, the continued forward movement of the pusher plate moving the article between the rear ends of the spaced guides for wrapping the opposite forward end portions of the article, the opposite upwardly-forwardly arcuate slots through which the remaining unfolded ends of the paper pass causing these unfolded ends to be folded upwardly for wrapping the opposite bottom end portions of the article.

3. In a wrapping machine having a drive shaft, a horizontally disposed table having a downwardly-forwardly angularly disposed rear portion provided with an opening therethrough and a horizontally disposed forward portion, said angularly disposed portion being adapted for supporting a pre-cut wrapping sheet over said opening and said forwardly disposed portion supporting a pair of spaced guides whose rear ends are provided with upwardly-forwardlly arcuate slots, means for rotatably supporting a roll of wrapping paper on said machine adapted to feed the paper strip onto the angularly disposed portion of the table, a knife mounted on the table for cutting the paper strip into lengths, an elevator disposed below said opening adapted for supporting an article to be wrapped, a normally upwardly urged clamping plate pivotally mounted adjacent the forward side of the opening, a pusher plate swingable to a position adjacent the rearward side of the opening and in spaced parallel relation with the clamping plate, a bottom plate provided with a pair of spaced transversely disposed plates swingable to a position wherein the bottom plate is disposed below the clamping plate and the pusher plate and its spaced transverse plates are disposed adjacent the opposite ends of the clamping plate and the pusher plate, a pair of spaced side plates downwardly swingable adjacent the opposite ends of the clamping plate and pusher plate, and synchronous mechanism operatively connecting the drive shaft with the roll, knife, elevator, clamping plate, pusher plate, bottom plate, and spaced side plates for sequentially causing the roll to rotate, thereafter causing the knife to function, thereafter causing the elevator to ascend through the opening and deliver its supported article between the embracing inside surfaces of the parallel spaced clamping and pusher plates for wrapping the top and opposite side portions of the article, thereafter causing the bottom plate to be swung to a position below the clamping and pusher plates, and after the descent of the elevator for wrapping the bottom rearward portion and the opposite rearward end portions of the article, thereafter causing the pair of spaced side plates to be swung downwardly adjacent the opposite ends of the clamping plate and pusher plate, and after the rearward swinging movement of the bottom plate for wrapping the opposite top end portions of the article, and thereafter causing the pusher plate to move the article forwardly over the forwardly folding clamping plate and over the forward side edge of the opening for wrapping the bottom forward portion of the article, the continued forward movement of the pusher plate moving the article between the rear ends of the spaced guides for wrapping the opposite forward end portions of the article, the opposite upwardly-forwardly arcuate slots through which the remaining unfolded ends of the paper pass causing these unfolded ends to be folded upwardly for wrapping the opposite bottom end portions of the article.

OSCAR SANDBERG.